United States Patent [19]

Gábor

[11] Patent Number: 4,893,525
[45] Date of Patent: Jan. 16, 1990

[54] CENTRALIZED WET-BRAKE AND OTHER IMPROVEMENTS FOR RUNNING GEARS WITH ADJUSTABLE WHEEL TRACK

[75] Inventor: Szalai Gábor, Győr, Hungary

[73] Assignee: Magyar Vagon es Gepgyar, Gyor, Hungary

[21] Appl. No.: 166,889

[22] Filed: Mar. 11, 1988

[30] Foreign Application Priority Data

Mar. 26, 1987 [HU] Hungary ............... 1317/87

[51] Int. Cl.⁴ ............................ F16H 1/44.5
[52] U.S. Cl. ................... 74/710.5; 74/713
[58] Field of Search ........... 74/710.5, 713, 695, 74/682, 756, 757, 789, 711, 710; 180/76

[56] References Cited

U.S. PATENT DOCUMENTS

| | | | |
|---|---|---|---|
| 1,435,473 | 11/1922 | Isaacson | 74/710.5 |
| 1,636,819 | 7/1927 | Huck | 74/695 |
| 1,660,113 | 2/1928 | Bjur | 74/695 |
| 3,448,635 | 6/1969 | Nelson | 74/710.5 |
| 3,453,905 | 7/1969 | Schmid | 74/710.5 |
| 3,621,957 | 11/1971 | Howe | 74/710.5 |
| 3,659,480 | 5/1972 | Koivunen | 74/710.5 |
| 4,004,472 | 1/1977 | Millward et al. | 74/713 |
| 4,263,824 | 3/1981 | Mueller | 74/710.5 |
| 4,526,063 | 7/1985 | Oster | 74/710.5 |
| 4,667,784 | 5/1987 | Cronin | 74/710.5 |
| 4,733,578 | 3/1988 | Glaze et al. | 74/713 |

FOREIGN PATENT DOCUMENTS

| | | | |
|---|---|---|---|
| 1280065 | 10/1968 | Fed. Rep. of Germany | 74/710.5 |
| 2453489 | 7/1975 | Fed. Rep. of Germany | 74/710.5 |
| 693430 | 4/1930 | France | 74/713 |
| 2343401 | 11/1977 | France | 74/710.5 |
| 60-237242 | 11/1985 | Japan | 74/710.5 |
| 106783 | 6/1917 | United Kingdom | 74/695 |
| 858528 | 1/1961 | United Kingdom | 74/710.5 |
| 993857 | 6/1965 | United Kingdom | 74/711 |

*Primary Examiner*—Dwight G. Diehl
*Attorney, Agent, or Firm*—Schweitzer & Cornman

[57] ABSTRACT

A differential mechanism for heavy-duty power machines with adjustable wheel tracks, such as farm machinery. The mechanism is provided with a specially constructed differential gear arrangement, including first and second differential gear housing parts. The first part supports an annular crown gear. The second part defines an open ended chamber. The housing is supported at each end in roller bearings. A centralized disc brake may be mounted externally on the second housing part. An anti-slip mechanism may be mounted on the inside of the second housing part. The anti-slip mechanism is controllably engagable.

5 Claims, 3 Drawing Sheets

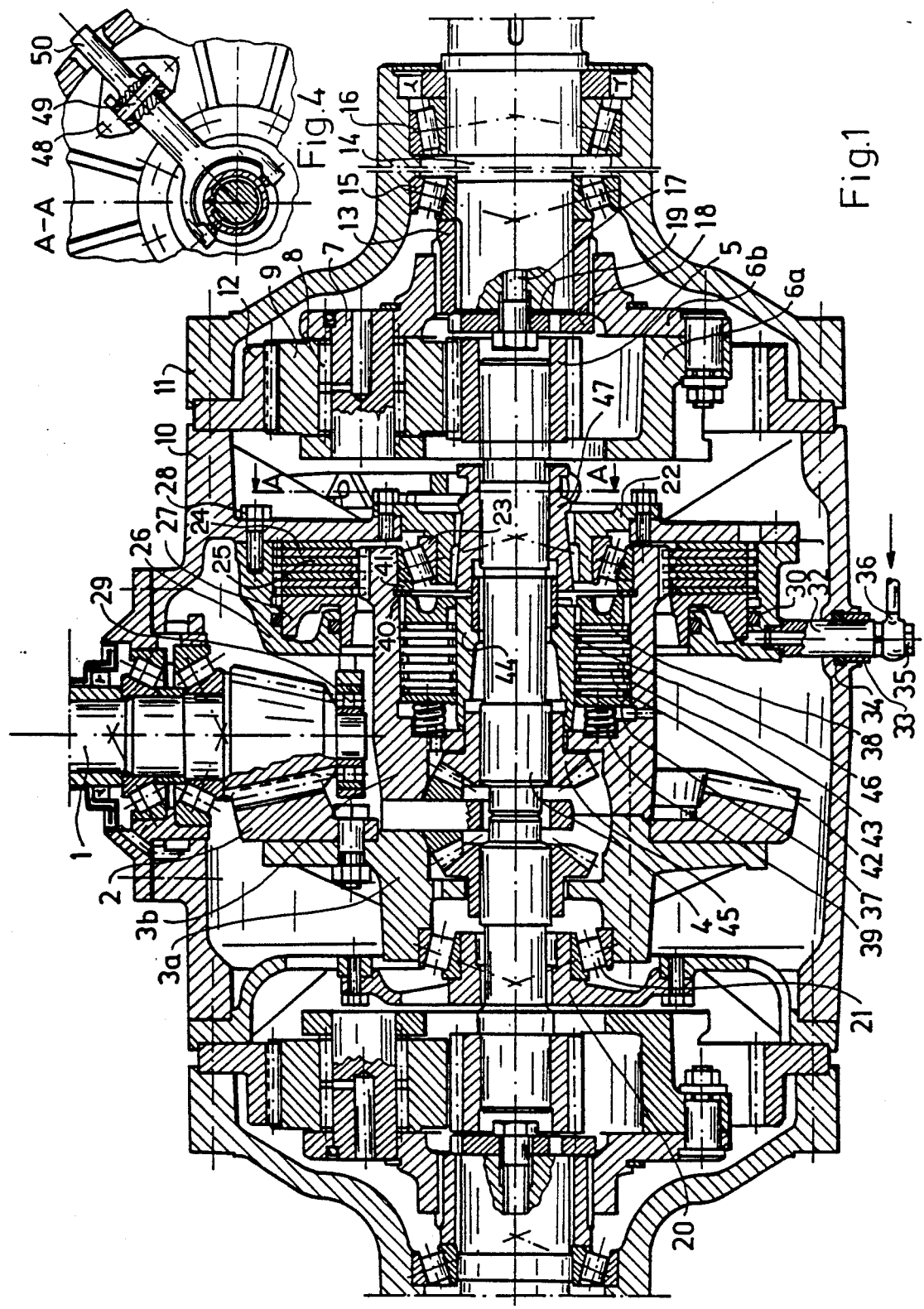

CENTRALIZED WET-BRAKE AND OTHER IMPROVEMENTS FOR RUNNING GEARS WITH ADJUSTABLE WHEEL TRACK

BACKGROUND OF THE INVENTION

The invention relates to a differential mechanism with double gear ratio transmission for vehicles, in particular for heavy-duty power machines with adjustable wheel tracks, such as farm machinery, in which a combined main drive is used, which is provided with a central wet disc brake construction and a connectable gear mechanism with restricted slip. Epicyclic gear mechanisms are arranged in the main gear housing to have an improved self-aligning ability, while the driving axles are arranged with improved bearing locations.

Running gears used in power machines with adjustable wheel tracks (also known as rod-type running gears) have to meet the most complicated—and frequently contradictory—requirements. For example, wide wheel tracks require solid half-shafts carried by perfectly adjusted bearing supports with high loadability; narrow wheel tracks require a middle-part with the minimum space requirement, which influences negatively realization of proper conditions related to the wide wheel tracks.

In vehicles lacking wheel hub drives, brake constructions can be arranged in main gear housings only. These are the so-called internal or wet-brakes. However, these solutions influence negatively the realization of the narrow and wide wheel track as well, as in this case the width of the middle-part is increased and, simultaneously, the space serving for the bearing supports of the drive shafts will be reduced.

Running gears of heavy-duty power machines with adjustable wheel tracks are designed generally with double gear transmissions based largely on conceptions that enable the width of the middle-part of the running gear to be reduced. This involves, however, the application of epicyclic gears with a high reduction ratio (generally over 5) and a bevel gear-crown-wheel pair also with a high gear ratio. The wide bearing basis required for a stiff bearing to support a crown wheel of a large diameter also exerts a negative influence on the possible realization of narrow and wide wheel tracks respectively.

When using wide wheel tracks, wheel forces are transmitted through large arms via the half-shafts to the gear housings and the middle-part of the running gear. When these half-shafts are stiffly assembled and not arranged as so-called "floating" half-shafts, they require most careful assembly. Otherwise, their useful life will be very short due to the considerable deformation of elements of the drive-chain.

Modern types of running gears used in agricultural power machines require differential mechanisms with restricted slip, with the possibility of coupling and decoupling the limited slip mechanism. Taking into consideration that, with the rod-type gears, "everything" is arranged in the middle-part and "everything" performs a rotary motion, a coupling fork cannot be built in. This is particularly true if the running gear is to be provided with an internal brake construction. For this reason, mechanically actuated differential gears with restricted slip—considered as the most reliable construction—have never been used.

The requirements mentioned above are met by the known construction only functionally. That means that they are reliable and able to function. However, contradictory characteristics are not eliminated. In other words, new constructional solutions are not paired with these running gears in order to fulfill tasks different from the traditional ones. By choosing obvious and offered solutions, the users accept the fact that parameters of the running gears are such as can be obtained with the traditional solutions. From this it results that generally known running gears for adjustable wheel track equipment (John-Deere, Massey-Ferguson, Steyr, etc.) are based on nearly identical principles of design, and they differ only in respect to partial solutions of the construction. These basic principles can be summarized as follows:

The differential gear driven with a bevel gear/crown wheel pair is generally supported by bearings in an "X"-arrangement. After the differential gear, the sun wheels —forming a monolithic unit with inner half-shafts—drive epicyclic gears, which are arranged adjacent the sides of the middle-part of the main housing. The carriers of the epicyclic gears are provided with an internal rib to drive directly the external axles.

One unit each of the generally hydraulically actuated inner disc brakes—one for each side—is arranged between the middle-part of the main housing and the epicyclic gears so that the active rotating discs engage with the teeth of the sun wheel.

A solution is also known, with which the rotating braking discs engage the carrier of the epicyclic gear, that being the drive element with the largest moment.

In the housing of the differential gear, formed with one or more dividing planes, differential gears with main drive pinion are used. Restricted slip is achieved in such manner that the traditional differential gear includes a hydraulically actuated or spring-pre-stressed bundle of lamellae, or the increased internal friction is established proportionally with the moment of the differential gear, e.g., by inserting a disc with spur-gearing with a large contact angle.

Now let us survey the negative features resulting from the described and presently used basic principles of projecting:

(1) Uniform support of the crown-wheel differential gear housing by bearings in an "X"-arrangement enables simple adjustment of the backlash and the bearings of the equalizing gear by means of the generally known bearing nuts. At the same time, in practice, a cross-spread arrangement (in other words, an "O"-arrangement) would result in a far more effective bearing basis.

(2) The disc brake, arranged on one side of the bridge housing has a considerable space requirement. If the users demand an external transmission brake instead of the internal wet-brake, the remaining unutilized empty space influences negatively the parameters of the running gear. This results from the fact that it is not at all economical to design separate constructions for both external and internal braking systems, as the number of produced running gears of either type is relatively low.

(3) In known constructions, active discs of the disc brake usually engaged with teeth of the sun-gear (side gear) or with the ribs on internal self-adjusting (so-called "floating") half-shafts. This is a rather contradictory solution, desirably affecting both the brake and the epicyclic gear, because the rotating brake discs, loaded with moment and requiring a good driving connection, are engaged with the side gears requiring, which must have the ability of self-adjustment, or with the inner half-shafts.

(4) Supporting bearings of the crown-wheel in an "X"-arrangement, as well as arranging the brake units along side of the middle-part of the main housing, practically excludes the possibility that a mechanically actuated differential gear with a selectively engageable restricted slip could be used. Hydraulically actuated lamella-bundles are more expensive and less reliable. At the same time, lamella-bundles which are are constantly pre-stressed with spring force, and which cannot be uncoupled, exert a negative influence on the driving system and abrade the tires, if the power machine travels on good surfaces, e.g., on a concrete road. Differential gears mechanisms where the coefficient of friction is increased proportionally with the moment (e.g., differential gears, incorporating discs with spur-gears with a large connection angle and combined with a bundle of lamellae) are efficient generally only if the desired high moment is available.

(5) With crown-wheel-differential gear supported in bearings with an "X"-arrangement, the differential gear housing is laterally closed. Accordingly, to obtain lamella-bundles with proper energy absorption, i.e., of sufficient volume—more than one dividing plane must be provided in the differential gear housing, involving compellingly increased costs.

(6) Bar-axles of running gears with adjustable wheel tracks are rigidly assembled. Bearing support is provided by bearings with high loadability adjusted to be tight fitting. Driving bar-axles are driven directly from the carriers of the epicyclic gears, through a ribbed drive. In practice, this drive is realized so that the ribbed hub of the carrier of the epicyclic gears is clamped rigidly between an inner taper-roller bearing of the bar-axle and a so-called supporting plate, as the hub of the carrier of the epicyclic gear also partakes in the support. Due to the rigid clamping of said carrier, self-adjusting ability of the gears is restricted. As a consequence, the gears receive accessory loads, as deformations of the loaded bar-axles are transferred to the epicyclic gears, thus shortening their useful life. That means that there is a disturbing interaction between the epicyclic gears and the bearings of the bar-axles.

The invention is based on the development of a heavy-duty running gear with internal disc brakes and a differential gear with restricted slip which can be mechanically coupled and uncoupled with restricted dimensions of the middle-part in consideration of the requirements of equipment with adjustable wheel tracks.

Power machines are known to which running gears with constant wheel tracks are used and with which epicyclic gear and brakes are arranged at the hub.

Power machines are also known which contain a central brake construction, which is mounted either on an auxiliary gear box or on the drive of the main drive of the—generally frontal—running gear. In both cases, it is important that the vehicle should meet all the requirements in respect to safe braking. It is quite obvious that the conventional solution for running gears with adjustable wheel tracks, wherein separate wet-brake constructions are arranged on each side, in other words for each wheel, results from the practice followed with traditional running gears, where wheel brakes used to be applied. The present invention is based on the recognition that one central so-called wet-brake suffices for running gears with adjustable wheel tracks, if this wet-brake is incorporated as part of the running gear.

In the middle-part of the running gears with adjustable wheel tracks, next to the driving bevel gear—on the side lying opposite to the crown-wheel—there is an expedient space for installing a centralized brake construction. If the centralized brake is arranged here, widening of the middle-part of the running gear becomes superfluous, as space requirements of the side facing the crown-wheel will be determinant in this case. In running gears designed in compliance with generally known practice, due to the symmetry related to the longitudinal axis of the vehicle (e.g., generally the two sides of the main housing are completely identical), the side facing the crown-wheel is not at all utilized. By the central arrangement according to the invention the housing of the equalizing gear is part of the brake construction; active brake discs are connected with the housing of the equalizing gear.

In order to be able to realize controllable, mechanical coupling of the differential gear with restricted slip, the housing of the equalizing gear must be accessible from the end. This could be achieved by placing the brake construction around the equalizing gear. A further prerequisite of accessibility is that the housing of the equalizing gear should be open on the end. This requirement can be met if the unit consisting of the equalizing gear and the crown-wheel is supported in bearings in a "cross-spread" arrangement, and in this way, further accessory advantages can be obtained. First of all, compared to the "X"-arrangement, the "cross-spread" arrangement of the bearings guarantees—with the same space requirement—a far better bearing basis. On the other hand, it enables the bundles of lamellae to be of sufficient volume, i.e., having the required ability of energy absorption to be installed from the outside. Further advantages are that the housing of the equalizing gear does not require more than one dividing plane. Moreover, the bundle of lamellae providing restricted slip, which completes the traditional differential gear with bevel gears, can be simply omitted, where desired, without disassembling the differential gear.

Adjacent the end of the middle-part of the running gear lying opposite to the crown-wheel—we established the conditions for installing a coupling fork. Thus, we produced a combined main drive unit provided with a centralized brake construction and with a differential gear with restricted slip with the possibility of controlled coupling.

The centralized braking system according to the invention—in contrast to general practice—does not brake the sun wheel (which requires the ability of self-adjustment) or the inner half-shafts, but it is connected to the housing of the equalizing gear. The latter is supported in bearings and provides an excellent guide to the rotating brake discs. In such a manner, the self-adjusting ability of the epicyclic gears can be improved.

The other part of the task to be solved is to make the epicyclic gears independent of the effect of the loaded half-shafts. As already mentioned before, according to presently known general practice, the hub-part of the carrier of the epicyclic gear, being clamped rigidly between the inner taper-roller bearing of a bar-axle and the supporting plate, transfers the driving moment to said bar-axles with the aid of ribs. Deformations of the loaded bar-axles are transferred to the carriers of the epicyclic gears and produce external loads in the epicyclic gear elements, which are restricted in respect to self-adjusting ability. This results in a shortened useful life.

In accordance with the invention independence of the epicyclic gears is realized so that a bushing—provided with ribs on both the outside and inside—is inserted between the bar-axle and the hub-parts of the epicyclic gear carriers. This bushing is clamped rigidly between an inner taper-roller bearing of the bar-rod and a supporting disc fitted tightly on the bar-rod by means of the ribs, while the hub-part of the carrier of the epicyclic gear is fitted loosely to the outer ribs. However, this hub-part does not partake in supporting the bearing of the bar-axle. In such a manner, the carrier of the epicyclic gear becomes completely self-aligning and independent: by the aid of the ribbed bushing it continues to transfer the driving moment to the bar-axle, but it is relieved from the deformations.

It is considered as essential that the loose rib bond be arranged outside the plane of the epicyclic gear. In such a manner, not only angle-setting but also compensation of errors resulting from eccentricity become possible. Application of the ribbed bushing yields the possibility that adjustment of the bearings of the bar-axles can be performed without affecting the carriers of the epicyclic gear, as only the bushing is involved in sustaining the bearings.

Application of the bushing according to the invention facilitates servicing of the running gears, as in the course of repairing or exchanging the epicyclic gears, bearings of the bar-axles need not be disassembled, which would be unavoidable with the presently known constructions.

Accordingly, we succeeded to realize another most important aim: epicyclic gears can be rendered completely independent and self-aligning. They are not influenced either by the brake constructions or the bar-axles, resulting obviously in the considerable prolongation of the useful life of the force transmitting elements without the necessity of increasing the dimensions or using special material quality or technologies.

DESCRIPTION OF THE DRAWING

The invention will be described in detail by means of preferable embodiments, by the aid of the accompanying drawings, wherein:

FIG. 1 is a cross-sectional view illustrating an expedient and completed embodiment of the running gear according to the invention, for equipment with adjustable wheel tracks.

FIG. 4 is a cross-sectional view as taken generally on line A—A of FIG. 1.

Referring to FIG. 1 it seems to be sufficient to discuss only the part of the construction which is provided with the centralized brake and the differential gear with restricted slip, as with the exception of these main components the other side of the mechanism is quite identical.

Figure 3:
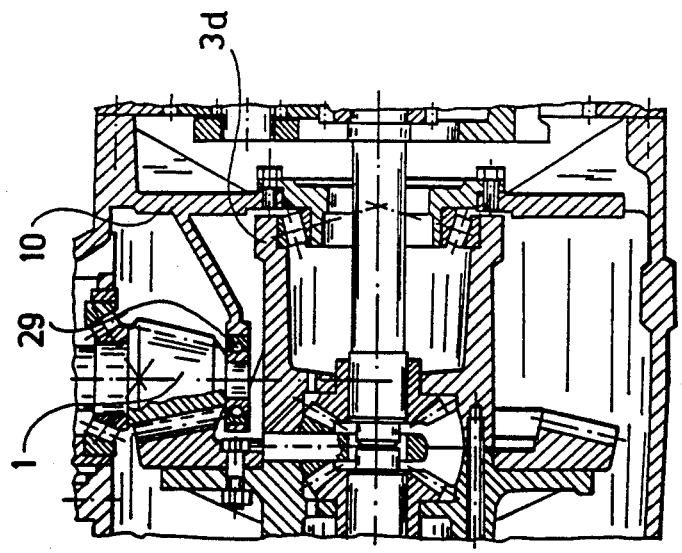
FIG. 3 is another fragmentary cross-sectional view illustrating possibly the most simple mode of realization of the construction of the invention.

The bevel gear 1 drives a crown-wheel 2, which is screwed to the housing of an equalizing gear consisting of the halves 3a, 3b. The sun wheel 5, connected to an inner half-shaft 4 with ribs, transfers the drive from the differential gear with the traditional bevel gear to the planet pinions 9, which are supported in the carrier 6a, 6b by means of needle-roller bearings 8 and pins 7. The gear rim 12 is clamped rigidly between the main gear box 10 and the end cover 11 and serves as a torque support. The carrier of the epicyclic gears is composed of carrier halves 6a and 6b, out of which the half-part 6b transfers the torque to the bushing 13 by means of a loose splined connection, which provides both radial and and axial clearance. The bushing 13 transfers the torque through its inner ribs or splines to the bar-axle 14, connected to the wheels of the vehicle. Bar-axle 14 is supported in bevel roller bearings 15 and 16. These can be adjusted by means of a bolt 17, the support disc 18 and the joining plates 19 and so that the bushing 13, provided with ribs on the inside and outside as well, is clamped between the supporting disc 18 and the inner bevel-roller bearing 15.

The structural unit consisting of the box of the equalizing gear and the crown-wheel is supported in bearings, in a "cross-spread" arrangement, namely in the bevel roller bearing 21 seated on the carrier 20 and in the bevel roller bearing 23 seated on the carrier 22.

The half-part 3b of the equalizing gear box is provided with splines or ribs on both the inside and outside. The outer ribs are in a driving connection with a set of rotating brake discs 24, which are braked by an interleaved set of stationary brake discs 25 provided with ribs on their external surfaces, a brake housing 26 is provided with inner ribs which engage the stationary brake discs loosely, but non-rotatively. When the brake housing becomes pressurized an annular brake-piston 27 is displaced to compress the stack of brake discs 24, 25. The brake housing 26 is fixed with screws 28 to the machined inner surface of the lateral face of the main gear box 10.

The bracket-supported carrier of the cylindrical roller bearing 29 for the bevel gear 1 is desirably cast as a monolithic unit with the brake housing 26.

The liquid space of the brake is separated by means of sealing rings 30 and 31 from the oil space of the running gear. A hollow tube 32, sealed by means of a sealing element 34, is secured with a fixing-screw 33. Said hollow extension can be mounted on the rear side of the running gear from outside. Brake fluid is introduced through the pipe 36 attached with a hollow screw 35. By means of components identical with those indicated with the reference numbers 32, 33, 34, 35, located on the bottom of the running gear, brake fluid can be suitably discharged, while on the upper part the working space of the brake can be deaerated without dissembling the oil space of the running gear.

In the half-part 3b of the box of the equalizing gear, we arranged the bundles of lamellae for restricting revolving of the equalizing gear box relative to the half-shaft 4. Compression springs 39 provide for constant pre-stress of the bundle of anti-slip lamellae arranged between a pressure disc 37 and a supporting disc 38. The axial force of the springs is regulated by a locking ring 40. The bevel roller bearing 23 bears against the other side of the locking ring 40 by the intervention of a spacer 41. Lamellae 42 formed with outer ribs engage with the inner ribs of the half-part 3b of the equalizing gear housing. These structural elements are dimensioned so that, after having removed the bevel roller bearing 23, lamellae 42 with the external ribs can be installed from outside. Lamella 43 with the internal ribs are engaging with the outer ribs of the toothed hub 44, while the inner end of said toothed hub is guided by a large bevel gear 45, and the other end thereof is guided by the centralizing ring 46. The task of the centralizing ring 46 is to guide concentrically the toothed hub 44 and frontal teeth of a sliding coupling sleeve 47. The sliding coupling sleeve 47 is able to slide on the ribs of the inner half-shaft 4 by mean of the coupling fork 50, which is supported in bearings by a pin 49, which again is clamped in the carrier 48. The coupling fork 50 can be led between the lateral wall of the gear box 10 and the epicyclic gear outside the gear box 10, and can be actuated with any optional fork-actuating device. The coupling fork 50 engages with the slotted part of the sliding coupling sleeve 47, which extends through an end opening in the bearing bracket 22. The installation of the coupling fork 50 and leading the same outside the gear box 10 are illustrated in FIG. 4.

If the frontal teeth 44a, 47a of the sliding coupling sleeve 47 and the splined hub 44 become engaged by means of the coupling fork 50, the torque of friction of the pre-stressed bundle of lamellae restricts the gyration of the equalizing gear. By proper pre-stressing of the compression springs 39, the so-called closing torque of the bundle of lamellae can be easily set to a desired value in accordance with the character of utilization. The extent of pre-stress can be varied by modifying the number of lamella-pairs or by choosing the thickness of the aforementioned supporting disc 38. It goes without saying that, if the sliding coupling sleeve 47 and the frontal toothing of the hub 44 are disengaged, the so-called closing torque of the bundle of lamellae does not influence the function of the equalizing gear with the traditional bevel gear. Thus, a power machine is operated under good soil conditions, e.g., it travels on a road coated with concrete or any other hard surface, the anti-slip lamellae can be uncoupled to avoid superfluous overload of the force transmitting elements and in accelerated wear of the tires.

Figure 2:
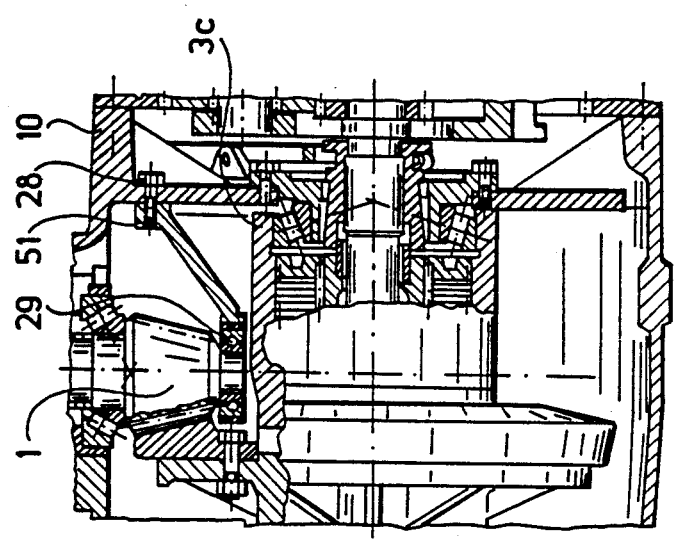
FIG. 2 is fragmentary cross-sectional view of another version of the construction according to the invention.
Figure 5:
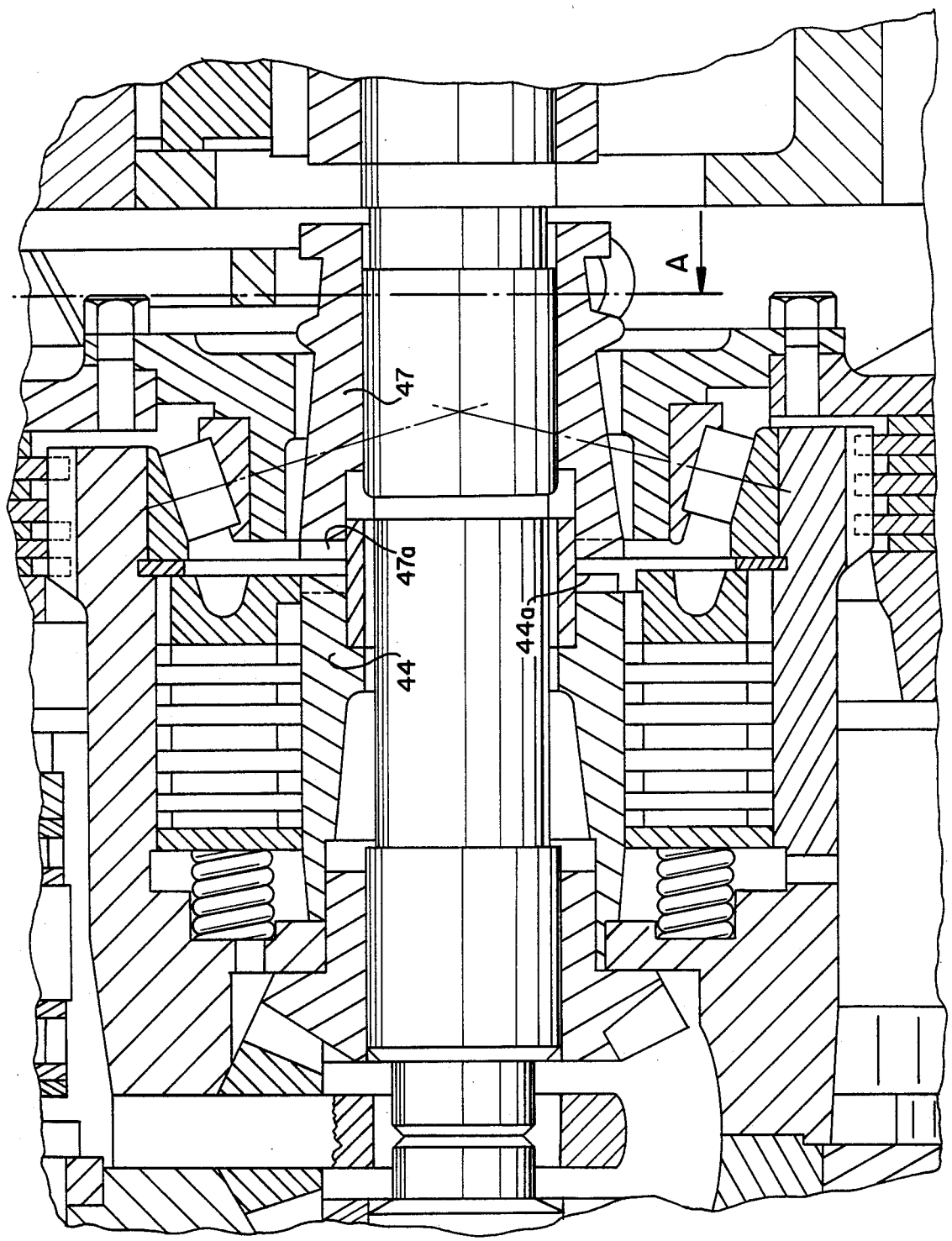
FIG. 5 is an enlarged, fragmentary, cross-sectional view showing details of the mechanism of FIG. 1.

FIG. 2 shows a version of the construction according to the invention, in which the internal wet-brake is replaced by external brake means (not shown). A carrier 51 supported in brackets, is fixed to the machined inner plane of the lateral face of the gear-box 10 by means of screws 28, instead of attaching a brake-housing. This carrier serves for clamping the cylinder roller bearing 29 of the driving bevel gear 1.

As the centralized brake construction is omitted, it suffices to construct the half-part 3c of the equalizing gearbox with ribs in the inside only.

FIG. 3 illustrates the most simple embodiment of the construction according to the invention. With this solution, the running gear does not contain either an internal brake construction or an equalizing gear with restricted slip. In this case, the bracket-supported carrier of the roller bearing 29 of the bevel gear 1 can be formed as a cast monolithic unit with the gearbox 10. It also seems to be expedient to apply the half-part 3d of the equalizing gearbox, as it is to be seen in FIG. 3, i.e., of the generally same open-ended configuration as in FIGS. 1 and 2.

From the figures, it becomes obvious that a running gear can also be assembled which contains a centralized internal brake, but at the same time it is provided with a traditional equalizing gear without the bundle of lamellae for assuring restricted slip.

From FIGS. 1, 2 and 3 it becomes quite obvious that by the application of the centralized wet-brake according to the invention, and by using the connectable equalizing gear with restricted slip, a combined main drive unit may be obtained, which yields the possibility of producing heavy-duty running gears with adjustable wheel track, constructed in different forms. The mechanism can be assembled with or without an internal brake unit, provided with a traditional equalizing gear, or with a controllably connectable equalizing gear with restricted slip. It can be observed that application or omission of main units fulfilling different functions do not influence negatively either technical parameters of the running gears or economical production.

It should be separately emphasized that in known practice—due to the brake units arranged on both sides—a double quantity of the components was required. At the same time, with the central arrangement according to the invention, only one single brake unit is to be installed. Technical parameters are thus considerably improved, as installation of the central brake does not demand increased dimensions of the middle-part of the running gear.

Bearing support of the centralized brake construction, and the unit consisting of the crown-wheel and the equalizing gear, in a "cross-spread" "O" arrangement (i.e., the housing for equalizing gears is supported by internal bearings) enables the bevel-geared equalizing gear to be completed with a mechanically connectable/disconnectable bundle of anti-slip lamellae. In addition, this bundle of anti-slip lamellae can be installed into the equalizing gear box from outside. Accordingly, the gear box requires but one dividing plane.

In the construction according to the invention, disturbing interaction between brake constructions and epicyclic gears can be eliminated. And by using a simple sleeve with inner and outer ribs, epicyclic gears are completely separated from the bar-axles. Adjustment of bearings of the bar-axles, and servicing of the running gears, is thus facilitated. By these measures, the useful life of the gears of the driving system can be considerably prolongated.

It should be understood that the forms of the invention illustrated and described are representative only, reference should be made to the appended claims in determining the full scope of the inventions.

I claim:

1. A differential gear mechanism for vehicle wheels which comprises:
   (a) a main housing including first and second spaced end walls,
   (b) first and second tapered-roller bearings supported by said main housing end walls,
   (c) an equalizer gear housing within said main housing and rotatably supported at each end by said bearings,
   (d) said equalizer gear housing comprising first and second axially joined gear housing parts,
   (e) said first gear housing part mounting an annular crown gear and being supported by said first bearing,
   (f) said first and second gear housing parts defining, in the region of their joining, a first chamber for first and second differential output bevel gears connected by bevel idler gear means,
   (g) said second gear housing part being rotatably supported by the outer race of said second bearing and further defining an open ended chamber adjacent to and opening toward said second main housing end wall, (h) first and second output half-shafts rotatably supported in said main housing and mounting said first and second output bevel gears, (i) said second half-shaft extending coaxially through said open ended chamber and defining therewith an annular space located between said first chamber and said second housing end wall, (j) said second housing part being provided on its outer surface with a longitudinally extending external spline, (k) an annular brake housing member secured to said second spaced end wall of said main housing and forming a wet brake chamber, (l) said brake housing member having a longitudinally extending internal spline on an internal surface thereof, spaced from and facing said external spline, (m) a plurality of annular braking discs received within said brake chamber, (n) alternate ones of said discs being slideably but non-rotatably associated with said respective internal and external splines, and (o) means within said wet-brake chamber for applying axial pressure to said braking discs tending to inhibit rotation of said gear housing within said main housing.

2. A differential gear mechanism for vehicle wheels which comprises:

(a) a main housing including first and second spaced end walls, (b) first and second tapered-roller bearings supported by said main housing end walls, (c) an equalizer gear housing within said main housing and rotatably supported at each end by said bearings, (d) said equalizer gear housing comprising first and second axially joined gear housing parts, (e) said first gear housing part mounting an annular crown gear and being supported by said first bearing, (f) said first and second gear housing parts defining, in the region of their joining, a first chamber for first and second differential output bevel gears connected by bevel idler gear means, (g) said second gear housing part being rotatably supported by the outer race of said second bearing and further defining an open ended chamber adjacent to and opening toward said second main housing end wall, (h) first and second output half-shafts rotatably supported in said main housing and mounting said first and second output bevel gears, (i) said second half-shaft extending coaxially through said open ended chamber and defining therewith an annular space located between said first chamber and said second housing end wall, (j) a plurality of annular anti-slip discs received within the annular space between said second half-shaft and said second gear housing part, (k) longitudinally extending external spline means associated with said second half-shaft and slidingly but non-rotatingly engaging first alternate ones of said anti-slip discs, (l) longitudinally extending internal spline means on said second gear housing part spaced from and facing the external spline means, (m) said external spline means slidingly but non-rotatingly engaging second alternate ones of said anti-slip discs, and (n) adjustable means for applying longitudinal pressure to said anti-slip discs tending to inhibit relative rotation between said gear housing and said second half-shaft.

3. A differential gear mechanism for vehicle wheels which comprises:

(a) a main housing including first and second spaced end walls, (b) an equalizer gear housing within said main housing and rotatably supported at each end by bearings in said spaced end walls, (c) said equalizer gear housing comprising first and second axially joined gear housing parts, (d) a first one of said gear housing parts mounting an annular crown gear and being supported by said first spaced main housing end wall, (e) said first and second gear housing parts defining, in the region of their joining, a first chamber for first and second differential output bevel gears connected by bevel idler gear means, (f) said second gear housing part being rotatably supported by said second spaced main housing end wall and further defining an open ended chamber adjacent to and opening toward said second spaced main housing end wall, (g) first and second output half-shafts rotatably supported in said main housing and mounting said first and second output bevel gears, (h) said second half-shaft extending coaxially through said open ended chamber and defining therewith an annular space located between said first chamber and said second housing end wall, (i) a plurality of annular anti-slip discs received within the annular space between said second half-shaft and said second gear housing part, (j) longitudinally extending external rib means associated with said second half-shaft and slidingly but non-rotatingly engaging first alternate ones of said anti-slip discs, (k) longitudinally extending internal rib means on said second gear housing part spaced from and facing the external rib means, (l) said internal rib means slidingly but non-rotatingly engaging second alternate ones of said anti-slip discs, (m) adjustable means for applying longitudinal pressure to said anti-slip discs tending to inhibit relative rotation between said gear housing and said second half-shaft, (n) first and second coupling sleeves carried by said second half-shaft, (o) the first coupling sleeve supporting and non-rotatingly engaging said first alternate anti-slip discs, and being rotatingly supported on said second half-shaft, (p) said second coupling sleeve being slideably but non-rotatingly supported on said second half-shaft, and (q) said first and second coupling sleeves having controllably engageable means for coupling said sleeves for rotation in unison.

4. A differential gear mechanism according to claim 3, further characterized by (a) said second coupling sleeve being connected to and slideably actuated by a shaft lever, and (b) said shaft lever being pivoted on said main housing and having a portion extending through the wall of said housing for external actuation.

5. A differential gear mechanism for vehicle wheels which comprises:
   (a) a main housing including first and second spaced end walls,
   (b) first and second bearing carriers carried by said first and second spaced end walls respectively,
   (c) roller bearings mounted on said first and second bearing carriers,
   (d) an equalizer mechanism within said main housing and rotatably supported by said bearings,
   (e) said equalizer mechanism including first and second output bevel gears,
   (f) first and second output half-shafts mounting said first and second output bevel gears,
   (g) said differential gear mechanism including an epicyclic gear mechanism on each side of said main housing, each including a central sun gear, a fixed ring gear, a plurality of planet gears, and a planet gear carrier having a hub portion provided on its internal surface with a longitudinally extending internal spline,
   (h) output shafts supported on inner and outer roller bearings and provided on their inboard-end portions with a longitudinally extending external spline,
   (i) a sleeve mounted on each output shaft and having a longitudinally extending external spline and also a longitudinally extending internal spline,
   (j) a retainer secured to the inboard-end face of each of said output shaft,
   (k) said sleeves being clamped by said retainer and being connected with their internal splines to the external splines of said output shafts and being connected with their external splines to the internal splines of the hub portions of said planet gear carriers, and
   (l) said first and second output half-shafts being floatingly supported at their inner ends by said differential output bevel gears and at their outer ends by said central sun gears.

* * * * *